United States Patent
Park et al.

(10) Patent No.: US 12,388,075 B2
(45) Date of Patent: Aug. 12, 2025

(54) METHODS OF FORMING ELECTROCHEMICAL CELLS

(71) Applicant: Enevate Corporation, Irvine, CA (US)

(72) Inventors: Benjamin Yong Park, Mission Viejo, CA (US); Ian Russell Browne, Orange, CA (US); Heidi Leighette Anderson, Newport Beach, CA (US)

(73) Assignee: ENEVATE CORPORATION, Irvine, CA (US)

( * ) Notice: Subject to any disclaimer, the term of this patent is extended or adjusted under 35 U.S.C. 154(b) by 523 days.

(21) Appl. No.: 16/749,851

(22) Filed: Jan. 22, 2020

(65) Prior Publication Data

US 2021/0226196 A1   Jul. 22, 2021
US 2022/0285670 A9   Sep. 8, 2022

Related U.S. Application Data

(63) Continuation-in-part of application No. 15/994,957, filed on May 31, 2018, now Pat. No. 10,763,538.
(Continued)

(51) Int. Cl.
| | |
|---|---|
| H01M 4/1395 | (2010.01) |
| H01M 4/1391 | (2010.01) |
| H01M 4/1393 | (2010.01) |
| H01M 10/0525 | (2010.01) |
| H01M 50/46 | (2021.01) |

(52) U.S. Cl.
CPC ....... *H01M 4/1395* (2013.01); *H01M 4/1391* (2013.01); *H01M 4/1393* (2013.01); *H01M 10/0525* (2013.01); *H01M 50/46* (2021.01)

(58) Field of Classification Search
CPC .......................... H01M 4/0445; H01M 4/0447
See application file for complete search history.

(56) References Cited

U.S. PATENT DOCUMENTS

| | | | |
|---|---|---|---|
| 9,397,338 B2 | 7/2016 | Park et al. | |
| 2010/0007248 A1* | 1/2010 | Chiang | F03G 7/005 |
| | | | 310/311 |

(Continued)

FOREIGN PATENT DOCUMENTS

| | | | | |
|---|---|---|---|---|
| CN | 105359304 A | * | 2/2016 | ............. B28B 3/025 |
| WO | WO-2014007026 A1 | * | 1/2014 | .......... H01M 10/052 |

OTHER PUBLICATIONS

Notification of Transmittal of the International Search Report and the Written Opinion of the International Searching Authority, or the Declaration for International PCT Application PCT/US2021/014153, International Filing Date Jan. 20, 2021, Applicant: Enevate Corporation, mailing date Mar. 30, 2021.

*Primary Examiner* — Stephan J Essex
(74) *Attorney, Agent, or Firm* — McAndrews, Held & Malloy, Ltd.

(57) ABSTRACT

Methods of forming electrochemical cells are described. In some implementations, the method can include providing an electrochemical cell having an electrode including electrochemically active material with at least about 20% to about 100% by weight of silicon. The method can include charging the electrochemical cell by providing a formation charge current at about 1 C or greater to the electrochemical cell. The method can also include discharging the electrochemical cell. In various implementations, substantially no rest of greater than about 5 minutes occurs between charging and discharging.

28 Claims, 6 Drawing Sheets

Related U.S. Application Data

(60) Provisional application No. 62/596,069, filed on Dec. 7, 2017.

(56) References Cited

U.S. PATENT DOCUMENTS

| | | |
|---|---|---|
| 2016/0072132 A1 | 3/2016 | Liao et al. |
| 2018/0309159 A1* | 10/2018 | Hori ................. H01M 10/0568 |
| 2019/0181491 A1 | 6/2019 | Park et al. |

* cited by examiner

METHODS OF FORMING ELECTROCHEMICAL CELLS

CLAIM OF PRIORITY

This patent application is a continuation-in-part of U.S. patent application Ser. No. 15/994,957, filed May 31, 2018, which in turn claims the benefit of U.S. Provisional Patent Application No. 62/596,069, filed Dec. 7, 2017. Each of the above identified applications is hereby incorporated herein by reference in its entirety.

BACKGROUND

Field

The present disclosure relates to electrodes, electrochemical cells, and methods of forming electrodes and electrochemical cells. In particular, the present disclosure relates to methods of formation of electrochemical cells, including lithium-ion batteries.

Description of the Related Art

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

In certain implementations, a method of forming an electrochemical cell is provided. The method can include providing an electrochemical cell having a rated capacity of 1 C. The cell can include a first electrode, a second electrode, and a separator between the first electrode and the second electrode. The cell can also include an electrolyte in contact with the first electrode, the second electrode, and the separator. At least the first electrode can comprise electrochemically active material having at least about 20% to about 100% by weight of silicon. The method can also include charging the electrochemical cell by providing a formation charge current at about 1 C or greater to the electrochemical cell and discharging the electrochemical cell. In various implementations, substantially no rest of greater than about 5 minutes occurs between charging and discharging. In some instances, no rest occurs between the charging and discharging.

In various implementations, the formation charge current can be provided at less than or equal to about 20 C. In some implementations, the formation charge current can be provided at greater than about 2 C. For example, the formation charge current can be provided at 4 C or greater. In some such instances, the formation charge current can be provided at less than or equal to about 20 C.

In some examples, the formation charge current can be provided for about 3 minutes to about 60 minutes. In some instances, providing the formation charge current can comprise charging to partial State of Charge (SOC). For example, charging to partial SOC can comprise charging to about 10% to about 90% of total capacity of the electrochemical cell, to about 20% to about 70% of the total capacity of the electrochemical cell, or to about 30% to about 50% of the total capacity of the electrochemical cell. As another example, the formation charge current can be provided at about 1 C to about 10 C up to a SOC of about 10% to about 50%. As yet another example, the formation charge current can be provided at about 2 C to about 6 C up to an SOC of about 20% to about 40%.

In some methods, providing the formation charge current can comprise providing a substantially constant formation charge current. In some methods, providing the formation charge current can comprise providing the formation charge current at a charge voltage from about 3 volts to about 6 volts.

In some implementations, the electrochemical cell can be a lithium-ion battery and providing the formation charge current can comprise providing the formation charge current with substantially no lithium plating. In some instances, the first electrode can be an anode. In some instances, the first electrode can comprise a silicon-dominant electrode. For example, the first electrode can comprise the electrochemically active material having the silicon at about 30% to about 100% by weight, at about 40% to about 100% by weight, at about 50% to about 100% by weight, at about 60% to about 100% by weight, at about 70% to about 100% by weight, or at about 80% to about 100% by weight. In some instances, the first electrode can further comprise graphite.

In some implementations, the first electrode can comprise a silicon-carbon composite material film. In some instances, the composite material film can be a self-supported composite structure. In some instances, the film can be attached to a current collector. In some implementations, the second electrode can comprise Lithium Nickel-Cobalt-Manganese oxide (NCM).

DETAILED DESCRIPTION

Formation is a step in the production process of electrochemical cells, such as lithium-ion batteries. This step typically occurs in a factory before delivery of cells to a customer. The formation step occurs after the cell has been assembled and before the cell is ready for normal use. The step usually involves applying current to the cell in such a way that causes lithium to be inserted into the negative electrode. This first "charge" can cause the system to undergo reversible and irreversible reactions. For stability, it may be desirable to control the reactions to control the interfacial layer known as the solid-electrolyte interface (SEI) formed between electrodes and electrolyte and to expel any gasses formed (e.g., such as in a process called degassing). In some cases, the temperature can be increased to increase reaction rate. During formation, typically, the potential of the negative electrode decreases. As the potential of the negative electrode decreases, it can fall below the stability window of the electrolyte solution. The electrolyte solution can begin to react with the negative electrode, forming the SEI. In general, the SEI can reduce and/or minimize further reactions between the negative electrode and the electrolyte solution without preventing the transport of lithium ions to and from the negative electrode. In order to control the nature of the SEI (and thus control the performance characteristics of the cell), it may be desirable to control the formation process. Typically, formation is done with low current in an environment with precise temperature control, and this combination of long process time (due to low current) and costly equipment (due to precise control) can make formation a significant portion of the cost of manufacturing lithium-ion batteries. High currents are generally avoided as they can cause lithium plating and/or other detrimental effects. This is the case especially with graphite which may be the most commonly used anode active material today. Accordingly, formation can be one of the most expensive parts of manufacturing (e.g., due to the time spent in the formation process and the equipment for formation). Many companies are looking to reduce time in formation so that capital investment costs can be reduced.

Figure 1:
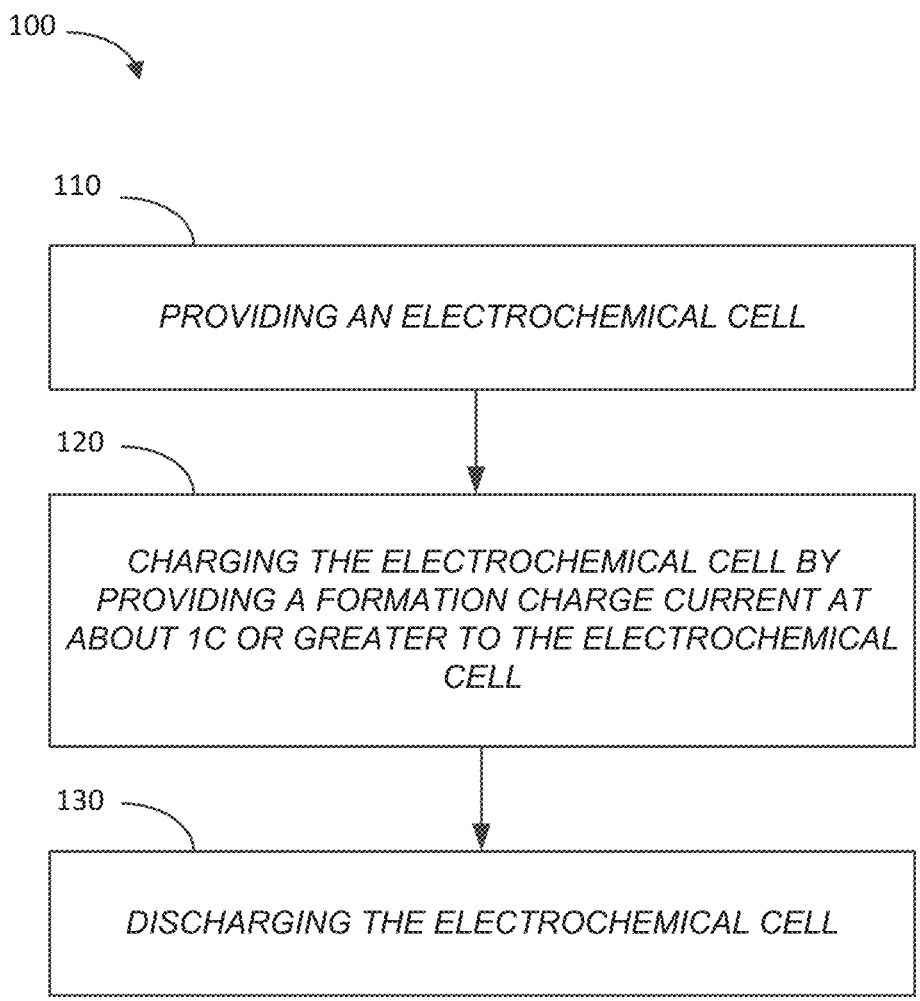
FIG. 1 is a flow diagram schematically illustrating an example method of forming an electrochemical cell in accordance with certain implementations described herein.

This application describes certain methods of forming an electrochemical cell which can be performed with decreased formation processing time and with less sophisticated equipment, e.g., compared with current processes. Some examples can include providing an electrochemical cell that has an electrode (e.g., an anode) comprising silicon (e.g., at least about 20% by weight of silicon). Some such electrodes can be advantageous in that relatively high current during formation can be applied without damage to the cell. For example, these electrodes can have relatively high potentials such that lithium plating and other detrimental effects are less likely. Accordingly, some methods can include providing a formation charge current at about 1 C or greater (or at about 1 C charge rate or greater). Rests during formation are typically used to stabilize the cell. When using a high rate of charge for formation, formation time can be significantly reduced. The rest time can then be a significant portion of the formation time. In various methods, there may be substantially no rest of greater than about 5 minutes during formation (e.g., between charging and discharging the cell), which can further reduce formation time and/or equipment costs. Formation FIG. 1 is a flow diagram schematically illustrating an example method of forming an electrochemical cell in accordance with certain implementations described herein. The method 100 of forming an electrochemical cell can include providing an electrochemical cell as shown in block 110, charging the electrochemical cell as shown in block 120, and discharging the cell as shown in block 130. With reference to block 110, the electrochemical cell can include a first and second electrode, a separator between the first and second electrodes, and electrolyte in contact with the first electrode, the second electrode, and the separator. At least one of the electrodes can comprise electrochemically active material with at least about 20% by weight of silicon (e.g., at least about 20% to about 100% by weight of silicon).

Various electrodes as described herein can handle relatively high charge current and/or charge rate without damage to the cell. Accordingly, as shown in block 120, the method 100 of certain implementations can include charging the cell by providing a formation charge current at about 1 C or greater to the cell.

Without being bound by theory, one reason various implementations of electrodes (e.g., anodes) described herein can take relatively high currents is because the electrodes have a relatively high potential, for example, compared to graphite vs Li/Li+. Because various silicon electrodes described herein are relatively high in voltage, the electrodes may not be fully utilized, and can have excess capacity.

In contrast, most electrodes that are considered "silicon anodes" in the industry are graphite anodes with silicon added in relatively small quantities (typically <20%). These graphite-silicon mixture anodes have to utilize the graphite which has a lower voltage compared to silicon. Because of this, the silicon has to be mostly fully utilized to utilize the graphite. Accordingly, these graphite electrodes may not have the advantage of various implementations of silicon or silicon composite electrodes where the voltage of the electrode is substantially above 10 mV vs Li/Li+.

Figure 2:
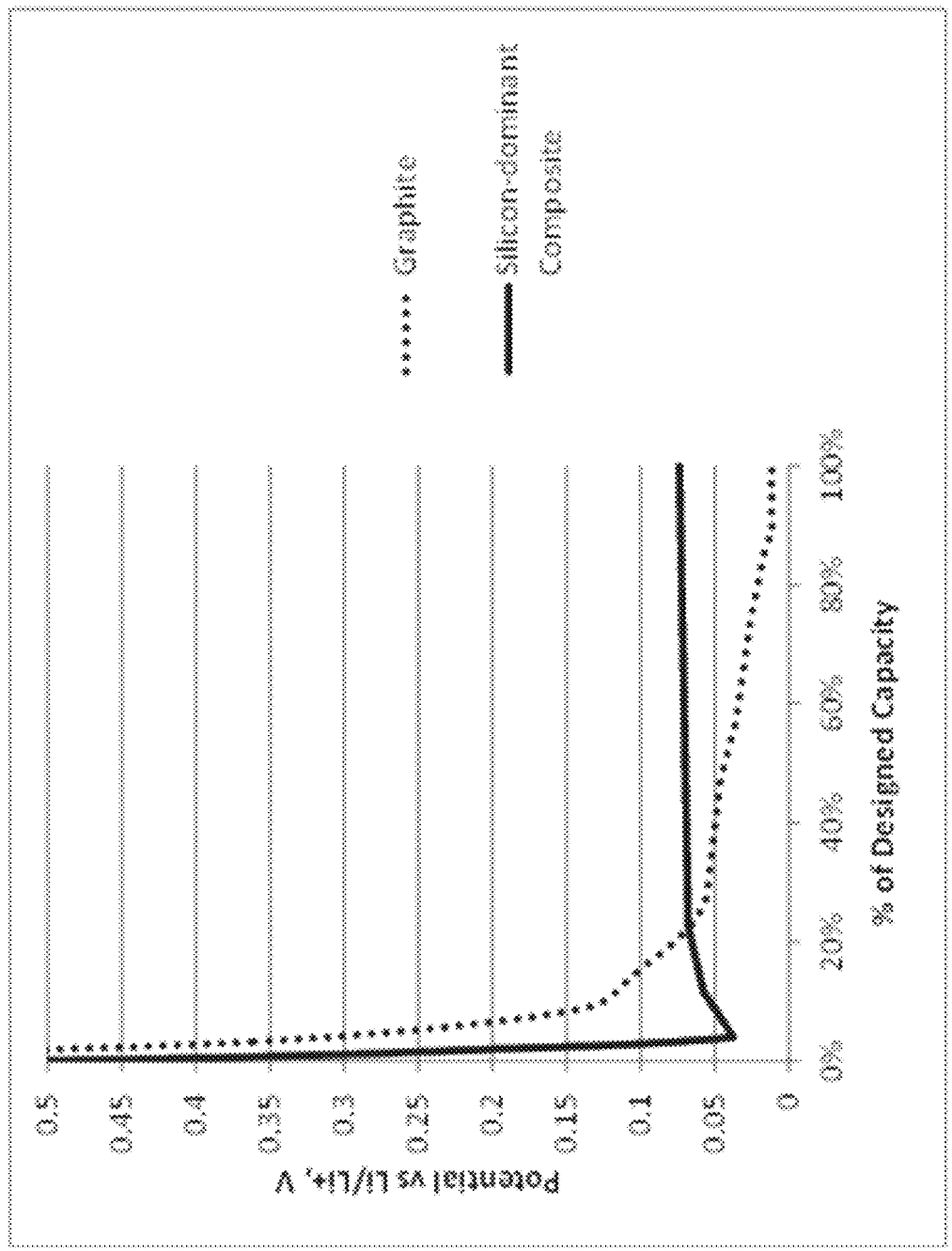
FIG. 2 shows a comparison between the formation voltage profiles of two half-cells made with a standard graphite electrode and an example silicon-dominant composite electrode.

FIG. 2 shows a comparison between the formation voltage profiles of two half-cells made with a standard graphite electrode and an example silicon-dominant composite electrode. In both cases, the electrodes were lithiated to their designed capacities. As shown in FIG. 2, the potential of the graphite electrode fell to ~10 mV vs Li/Li+, whereas the potential of the silicon-dominant composite electrode stabilized at ~70 mV vs Li/Li+ after the initial activation. The graphite electrode was a 3.1 mA/cm$^2$, 96% graphite, 4% PVdF coated anode. It was formed at 0.68 mA/cm$^2$ to 10 mV and tapered to 0.11 mA/cm$^2$. The silicon-dominant composite electrode was a 2.97 mA/cm$^2$, 80% silicon composite anode. It was formed at 0.30 mA/cm$^2$ to nominal capacity. The relatively low potential of the graphite electrode can be problematic because non-uniformities in current density, diffusion, or charge transfer rate can create localized areas of low potential where lithium plating can occur. In contrast, the relatively high potential of the silicon-dominate composite electrode makes lithium plating dramatically less likely. Via Ohm's law, the relative rate advantage of the silicon-dominant composite electrode over the graphite electrode at a given impedance can be expressed as the ratio of the characteristic potentials vs. Li/Li+. Accordingly, the example silicon-dominant composite electrode can have a 7× improvement (e.g., 70 mV/10 mV) in rate capability over the graphite anode.

With reference to block 110 in FIG. 1, the provided electrochemical cell can include at least one electrode comprising a silicon-containing electrode (e.g., a silicon-dominant electrode in some instances). The electrode can include electrochemically active material with at least about 20% by weight of silicon. In certain implementations, the electrode can include electrochemically active material with at least about 20% to about 100% by weight of silicon. For example, the weight percentage of silicon can be any value within this range (e.g., about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., about 30% to about 100%, about 40% to about 100%, about 50% to about 100%, about 60% to about 100%, about 70% to about 100%, about 80% to about 100%, about 90% to about 100%, about 30% to about 99%, about 40% to about 99%, about 50% to about 99%, about 60% to about 99%, about 70% to about 99%, about 80% to about 99%, about 90% to about 99%, about 30% to about 95%, about 40% to about 95%, about 50% to about 95%, about 60% to about 95%, about 70% to about 95%, about 80% to about 95%, about 30% to about 90%, about 40% to about 90%, about 50% to about 90%, about 60% to about 90%, about 70% to about 90%, about 80% to about 90%, etc.). In some implementations, the electrode can include silicon particles coated on a current collector (e.g., with a binder). In some instances, the electrochemically active material can comprise 100% silicon. The electrode can also include additives such as conductive material (e.g., one or more metals or alloys) and/or graphite active material. U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" and U.S. patent application Ser. No. 13/799,405, filed Mar. 13, 2013, and published on Jun. 19, 2014 as U.S. Patent Application Publication No. 2014/0166939, entitled "Silicon Particles for Battery Electrodes," each of which are incorporated by reference herein, describe certain implementations of carbon-silicon composite materials using carbonized polymer and silicon material which can be used as the silicon-containing electrode. Some example implementations of the electrode are described herein.

The silicon-containing electrode can be used as an anode, a cathode, or both an anode and cathode. For example, the composite material can be used as an anode in electrochemical cells, e.g., most conventional lithium-ion batteries; they may also be used as the cathode in some electrochemical couples, e.g., with additional additives. In some instances, the voltage of the electrodes can be designed to be higher than about 20 mV to about 70 mV vs Li/Li+. Various implementations of the provided electrochemical cells can be either secondary batteries (e.g., rechargeable) or primary batteries (e.g., non-rechargeable). The electrochemical cell can have a rated capacity of 1 C.

With reference to block 120 in FIG. 1, the cell can be charged by providing a formation charge current. The formation charge current can be provided at about 1 C or greater (e.g., at about 1 C, greater than about 1 C, greater than about 1.1 C, greater than about 1.2 C, greater than about 1.5 C, greater than about 1.7 C, etc.) to the electrochemical cell. In some implementations, the formation charge current can be provided at about 1 C to about 20 C. For example, the formation charge current can be provided at any charge rate within this range (e.g., about 1 C, about 1.1 C, about 1.2 C, about 1.3 C, about 1.5 C, about 1.7 C, about 2 C, about 2.5 C, about 3 C, about 3.5 C, about 4 C, about 4.5 C, about 5 C, about 6 C, about 7 C, about 10 C, about 12 C, about 15 C, about 17 C, about 20 C, etc.), or any range within this range such as any range formed by the example values (e.g., about 1 C to about 20 C, greater than about 1 C to about 20 C, about 1.2 C to about 20 C, about 1.5 C to about 20 C, about 1.7 C to about 20 C, about 2 C to about 20 C, about 3 C to about 20 C, about 4 C to about 20 C, about 1 C to about 15 C, greater than about 1 C to about 15 C, about 1.5 C to about 15 C, about 2 C to about 15 C, about 3 C to about 15 C, about 4 C to about 15 C, about 1 C to about 10 C, greater than about 1 C to about 10 C, about 1.5 C to about 10 C, about 2 C to about 10 C, about 3 C to about 10 C, about 4 C to about 10 C, about 1 C to about 6 C, greater than about 1 C to about 6 C, about 1.5 C to about 6 C, about 2 C to about 6 C, about 3 C to about 6 C, about 4 C to about 6 C, etc.). Other examples are possible. In some instances, the formation charge current can be substantially constant. In some such instances, the formation charge current can be substantially constant for a certain period of time followed by a taper charge to a lower rate, for example, as under a constant current, constant voltage procedure. In some cases, the formation charge current may vary. In some instances, formation can be performed using a constant charge voltage (e.g., providing initial charge current at a substantially constant charge voltage). Although current may vary under a constant charge voltage, the need for precise current control and/or other programing requirements can be reduced and/or minimized. In some implementations, the charge voltage (for constant current or constant voltage) can be from about 3V to about 6V (e.g., about 3V, about 3.5V, about 4V, about 4.5V, about 5V, about 5.5V, about 6V, etc.).

In various implementations, the formation charge current can be provided to the electrochemical cell with substantially no lithium plating and/or other undesired side reactions during formation. Because the silicon-containing electrodes can accept relatively high charge rates, formation can be performed in a fraction of time compared to conventional manufacturing. In some implementations, the formation charge current can be provided for only about 3 minutes to about 60 minutes (e.g., compared to about 360 minutes for conventional manufacturing). For example, the amount of time the formation charge current is provided can be any amount of time within this range (e.g., about 3 minutes, about 3.5 minutes, about 4 minutes, about 4.5 minutes, about 5 minutes, about 5.5 minutes, about 6 minutes, about 6.5 minutes, about 7 minutes, about 7.5 minutes, about 8 minutes, about 8.5 minutes, about 9 minutes, about 9.5 minutes, about 10 minutes, about 11 minutes, about 12 minutes, about 13 minutes, about 14 minutes, about 15 minutes, about 20 minutes, about 25 minutes, about 30 minutes, about 35 minutes, about 40 minutes, about 45 minutes, about 50 minutes, about 55 minutes, about 60 minutes, etc.), or any range within this range such as any range formed by the example values (e.g., about 3 minutes to about 50 minutes, about 3 minutes to about 45 minutes, about 3 minutes to about 30 minutes, about 3 minutes to about 20 minutes, about 3 minutes to about 15 minutes, about 3 minutes to about 10 minutes, about 5 minutes to about 50 minutes, about 5 minutes to about 45 minutes, about 5 minutes to about 30 minutes, about 5 minutes to about 20 minutes, about 5 minutes to about 10 minutes, etc.).

With reference to block 130 in FIG. 1, the electrochemical cell can be discharged. During discharge, the cell is connected through a circuit with a load that consumes power. Lithium is removed from the negative electrode, lithium ions diffuse through the electrolyte solution to the positive electrode, and are inserted into the positive electrode. Electrons travel through the circuit from the negative terminal to the positive terminal. This is in contrast to charge, where the cell is connected to a power source, and both the lithium and electrons travel through the reverse path. In general, a formation process may include a rest step to allow the cell to reach equilibrium before proceeding to a different step (e.g., between charging and discharging). When a cell is at rest, it is not being charged or discharged. It is not connected to a load or a power source. In some instances, it may be connected to an open circuit. As described herein, when using a high rate of charge for formation, the formation time can be reduced. The rest time can become a significant portion of the formation time. In various implementations, the formation charge current occurs fast enough that the rest time can be reduced and/or substantially no rest is needed. In some implementations, substantially no rest of greater than 5 minutes (e.g., no greater than about 4 minutes, no greater than about 3 minutes, no greater than about 2 minutes, no greater than about 1 minute, no rest, etc.) occurs between steps such as the charge and discharge steps, which can further reduce formation time and/or equipment costs. Various such methods can reduce the rest time and/or even eliminate the rest step with no negative consequence.

Figure 3:
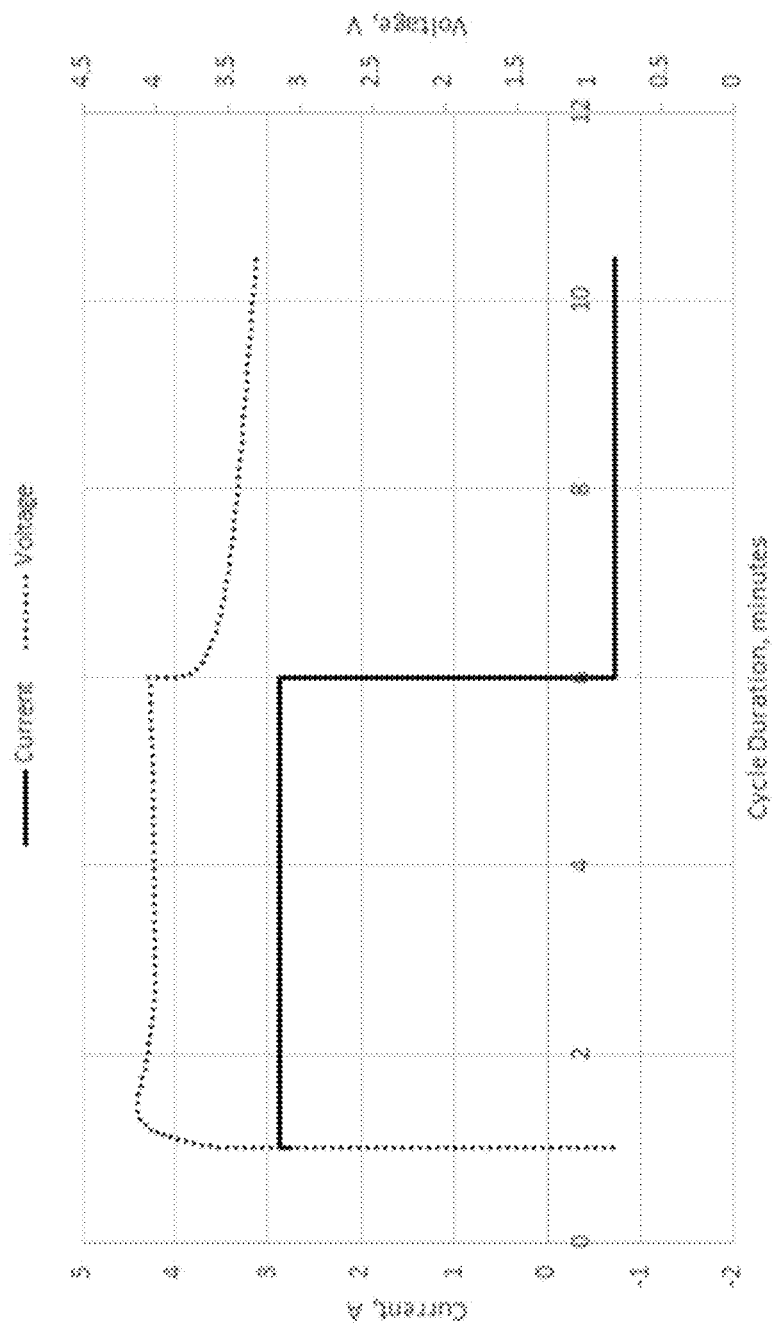
FIG. 3 shows an example current and voltage profile for an example formation protocol.

FIG. 3 is an example current and voltage profile for an example formation protocol. In the example protocol, a substantially constant formation charge current (e.g., at about 3 A) is provided for a duration (e.g., about 5-6 minutes), after which the cell can be discharged for a duration (e.g., between about 4-6 minutes). In some instances, the formation charge current can be provided for the duration or until a certain voltage is reached (e.g., 4.5V). No rests are used between charging and discharging in this example formation process.

The whole formation process, which may typically include charge, rest, discharge, and additional steps such as aging at temperature, may be completed in about 15 hours to about 60 hours for conventional manufacturing. In various implementations described herein, the whole formation process may include no rest and/or aging and may be completed in about 10 minutes to about 120 minutes. Other examples are possible.

In some instances, to further reduce processing time and/or reduce irreversible capacity, the cell can be charged to partial State of Charge (SOC). For example, the formation charge current can be provided from about 10% to about 90% of the total capacity of the cell. For example, the formation charge current can be provided to any percentage within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, etc.), or any range within this range such as any range formed by the example values (e.g., about 15% to about 90%, about 20% to about 90%, about 30% to about 90%, about 40% to about 90%, about 50% to about 90%, about 10% to about 80%, about 15% to about 80%, about 20% to about 80%, about 30% to about 80%, about 40% to about 80%, about 50% to about 80%, about 10% to about 70%, about 15% to about 70%, about 20% to about 70%, about 30% to about 70%, about 40% to about 70%, about 50% to about 70%, about 10% to about 60%, about 15% to about 60%, about 20% to about 60%, about 30% to about 60%, about 40% to about 60%, about 50% to about 60%, about 10% to about 50%, about 15% to about 50%, about 20% to about 50%, about 30% to about 50%, about 10% to about 40%, about 15% to about 40%, about 20% to about 40%, about 30% to about 40%, etc.). Other examples are possible.

An example formation protocol can include charging by providing a formation charge current at about 1 C to about 10 C up to an SOC of about 10% to about 50%. Another example formation protocol can include charging by providing a formation charge current at about 2 C to about 6 C up to an SOC of about 20% to about 40%. In various implementations, there may be substantially no rest of greater than 5 minutes between charging and discharging. In some instances, there may be no rest between charging and discharging.

Electrodes and Methods of Forming the Same

In various implementations, the electrodes (e.g., anodes and cathodes) may include carbonized polymer and silicon material. For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium-ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

U.S. patent application Ser. No. 13/008,800, U.S. patent application Ser. No. 13/601,976, and U.S. patent application Ser. No. 13/799,405, each of which are incorporated by reference herein, describe certain implementations of carbon-silicon composite materials using carbonized polymer and silicon material. The carbonized polymer can act as an expansion buffer for silicon particles during cycling so that a high cycle life can be achieved. In certain implementations, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some implementations. Accordingly, in U.S. patent application Ser. No. 13/008,800, application Ser. No. 13/601,976, and U.S. patent application Ser. No. 13/799,405, certain implementations of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain implementations, the carbon precursor is a hydrocarbon compound. For example, the precursor can include polyamide-imide (PAI), polyamic acid, polyimide (PI), etc. Other precursors include phenolic resins, epoxy resins, and other polymers. The mixture can further include a solvent.

For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain implementations, the amount of precursor (e.g., solid polymer) in the solvent is about 10 wt. % to about 30 wt. %.

The mixture can include silicon particles as described herein. The mixture may comprise about 1% to about 80% by weight of the precursor, and at least about 20% to about 99% by weight of the silicon particles. Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain implementations, the mixture is cast on a substrate. In some implementations, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some implementations, the substrate comprises polyethylene terephthalate (PET), including for example Mylar®. In certain implementations, the dried mixture is a film or sheet. In some implementations, the dried mixture is optionally cured. In some implementations, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, deionized (DI) water can be used to rinse the dried mixture. In certain implementations, tape casting techniques can be used for the casting. In some implementations, the mixture can be coated on a substrate by a slot die coating process (e.g., metering a constant or substantially constant weight and/or volume through a set or substantially set gap). In some other implementations, there is no substrate for casting and the anode film does not need to be removed from any substrate. The dried mixture may be cut or mechanically sectioned into smaller pieces.

The mixture further goes through pyrolysis to convert the polymer precursor to carbon. In certain implementations, the mixture is pyrolysed in a reducing atmosphere. For example, an inert atmosphere, a vacuum and/or flowing argon, nitrogen, or helium gas can be used. In some implementations, the mixture is heated to about 900° C. to about 1350° C. For example, polyimide formed from polyamic acid can be carbonized at about 1175° C. for about one hour. In certain implementations, the heat up rate and/or cool down rate of the mixture is about 10° C./min. A holder may be used to keep the mixture in a particular geometry. The holder can be graphite, metal, etc. In certain implementations, the mixture is held flat. After the mixture is pyrolysed, tabs can be attached to the pyrolysed material to form electrical contacts. For example, nickel, copper or alloys thereof can be used for the tabs.

In certain implementations, one or more of the methods described herein can be carried out in a continuous process. In certain implementations, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a pyrolytic carbon and results in one or more carbon phases. The term "pyrolytic carbon" refers to carbon formed by pyrolysis. Pyrolytic carbon may comprise hard carbon and/or soft carbon, but does not include graphite. In some implementations, the precursor is any material that can be pyrolysed to form a pyrolytic carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from about 20% to about 99% by weight of the composite material.

In some instances, the electrochemically active material can include about 20% to about 99% by weight of silicon. For example, the amount of silicon by weight of the electrochemically active material can include any weight percent within this range (e.g., about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., from about 20% to about 35% by weight, from about 20% to about 50% by weight, from about 20% to about 90% by weight, from about 20% to about 95% by weight, from about 20% to about 99% by weight, from about 30% to about 85% by weight, from about 30% to about 90% by weight, from about 30% to about 95% by weight, from about 30% to about 99% by weight, from about 40% to about 85% by weight, from about 40% to about 90% by weight, from about 40% to about 95% by weight, from about 40% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, from about 80% to about 90% by weight, from about 80% to about 95% by weight, from about 80% to about 99% by weight, from about 90% to about 99% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 60% to about 95% by weight of silicon, at least about 60% to about 99% by weight of silicon, at least about 70% to about 95% by weight of silicon, at least about 70% to about 99% by weight of silicon, at least about 80% to about 95% by weight of silicon, at least about 80% to about 99% by weight of silicon, etc. In some examples, the electrochemically active material can include 99% by weight of silicon.

In some implementations, all, substantially all, or at least some of the silicon particles may have a particle size (e.g., the diameter or the largest dimension of the particle) less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, and about 100 nm. For example, in some implementations, the average particle size (or the average diameter or the average largest dimension) or the median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, and about 100 nm. In some implementations, the silicon particles may have a distribution of particle sizes. For example, at least about 95%, at least about 90%, at least about 85%, at least about 80%, at least about 70%, or at least about 60% of the particles may have the particle size described herein.

In certain implementations, the silicon particles are at least partially crystalline, substantially crystalline, and/or fully crystalline. Furthermore, the silicon particles may or may not be substantially pure silicon. For example, the silicon particles may be substantially silicon or may be a silicon alloy. In one implementation, the silicon alloy includes silicon as the primary constituent along with one or more other elements.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 80% by weight such as about 1% to about 80% by weight, about 1% to about 70% by weight, about 1% to about 60% by weight, about 1% to about 50% by weight, about 1% to about 40% by weight, about 1% to about 30% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor. The carbon is obtained through heating a carbon-containing precursor at a temperature sufficient for pyrolysis of the precursor to occur, and is thus pyrolytic carbon.

The carbon from the precursor can be hard carbon and/or soft carbon. Hard carbon can be a carbon that does not convert into graphite even with heating in excess of 2800 degrees Celsius. Precursors that melt or flow during pyrolysis convert into soft carbons with sufficient temperature and/or pressure. In some instances, upon further heat treatment (e.g., between 2000° C.-3000° C.), precursors may form graphite. Hard carbon may be selected in some implementations since soft carbon precursors may flow and soft carbons and graphite are mechanically weaker than hard carbons. Possible pyrolytic carbon precursors can include polyimide (or a polyimide precursor), other aromatic polyimides, phenolic resins, epoxy resins, poly(p-phenylene vinylene) (PPV), poly(p-phenylene-1,3,4-oxadiazole) (POD), benzimidazobenzophenanthroline ladder (BBL) polymer, and other polymers that have a very high melting point or are crosslinked. The amount of pyrolytic carbon (e.g., hard carbon and/or soft carbon, but not graphite) in the composite material can be any of the ranges described herein with respect to the amount of carbon obtained from the precursor. For example, in some implementations, the amount of hard carbon in the composite material can have a value within a range of greater than 0% to about 80%, such as about 1% to about 10%, about 1% to about 20%, about 1% to about 25%, about 1% to about 30%, about 1% to about 40%, about 1% to about 50%, about 5% to about 10%, about 5% to about 20%, about 5% to about 25%, about 5% to about 30%, about 5% to about 40%, about 5% to about 50%, about 10% to about 25% by weight, about 10% to about 30% by weight, about 10% to about 40% by weight, about 10% to about 50% by weight, etc. In some implementations, the amount of hard carbon in the composite material can be about 1% by weight, about 5% by weight, about 10% by weight, about 20% by weight, about 30% by weight, about 40% by weight, about 50% by weight, or more than about 50% by weight. In certain implementations, the pyrolytic carbon phase is substantially amorphous. In other implementations, the pyrolytic carbon phase is substantially crystalline. In further implementations, the pyrolytic carbon phase includes amorphous and crystalline carbon. The pyrolytic carbon phase can be a matrix phase in the composite material. The pyrolytic carbon can also be embedded in the pores of the additives including silicon. The pyrolytic carbon may react with some of the additives to create some materials at interfaces. For example, there may be a layer of silicon carbide and/or silicon carbide containing oxygen (Si—C—O) between silicon particles and the pyrolytic carbon.

In some implementations, upon further heat treatment, graphite is one of the types of carbon phases from the precursor. In certain implementations, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer (in certain directions) than pyrolytic carbon and can better absorb the volume expansion of silicon additives. In certain implementations, all, substantially all, or at least some of the graphite particles may have a particle size (e.g., a diameter or a largest dimension) between about 0.5 microns and about 20 microns. In some implementations, an average particle size (e.g., an average diameter or an average largest dimension) or median particle size (e.g., a median diameter or a median largest dimension) of the graphite particles is between about 0.5 microns and about 20 microns. In some implementations, the graphite particles may have a distribution of particle sizes. For example, at least about 95%, at least about 90%, at least about 85%, at least about 80%, at least about 70%, or at least about 60% of the particles may have the particle size described herein. In certain implementations, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain implementations, conductive particles which may also be electrochemically active are added to the mixture. Such particles can enable both a more electronically conductive composite as well as a more mechanically deformable composite capable of absorbing the large volumetric change incurred during lithiation and de-lithiation. In certain implementations, all, substantially all, or at least some of the conductive particles can have a particle size (e.g., the diameter or the largest dimension) between about 10 nanometers and about 7 micrometers. In some implementations, an average particle size (e.g., an average diameter or an average largest dimension) or a median particle size (e.g., a median diameter or a median largest dimension) of the conductive particles is between about 10 nm and about 7 micrometers. In some implementations, the conductive particles may have a distribution of particle sizes. For example, at least about 95%, at least about 90%, at least about 85%, at least about 80%, at least about 70%, or at least about 60% of the particles may have the particle size described herein.

In certain implementations, the mixture includes conductive particles in an amount greater than zero and up to about 80% by weight. In some implementations, the composite material includes about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolysed in a polymer matrix. Alternatively, the conductive particles can be metals or alloys including copper, nickel, or stainless steel.

After the precursor is pyrolyzed, the resulting carbon material can be a self-supporting monolithic structure. The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain implementations, material particles added to the mixture are homogenously or substantially homogeneously distributed throughout the composite material to form a homogeneous or substantially homogeneous composite.

In some implementations, the composite material and/or electrode does not include a polymer beyond trace amounts that remain after pyrolysis of the precursor. In further implementations, the composite material and/or electrode does not include a non-electrically conductive binder. The composite material may also include porosity. In some implementations, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. In some instances, the current collector can include copper, nickel, stainless steel, aluminum, etc. U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," and U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," each of which is incorporated by reference herein, describe certain implementations of electrodes including a current collector, electrochemical cells comprising such electrodes, and methods of forming such electrodes and electrochemical cells.

In some implementations, the full capacity of the composite material of the electrodes described herein may not be utilized during use of the battery to improve life of the battery (e.g., number charge and discharge cycles before the battery fails or the performance of the battery decreases below a usability level). For example, a composite material with about 70% by weight of silicon particles, about 20% by weight of carbon from a precursor, and about 10% by weight of graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain implementations, the composite material is used or only used at an gravimetric capacity below about 70% of the composite material's maximum gravimetric capacity. For example, the composite material is not used at an gravimetric capacity above about 70% of the composite material's maximum gravimetric capacity. In further implementations, the composite material is used or only used at an gravimetric capacity below about 50% of the composite material's maximum gravimetric capacity or below about 30% of the composite material's maximum gravimetric capacity.

Slurry-Based Electrodes and Methods of Forming the Same

In some implementations, the electrode can include silicon particles (e.g., as described herein) coated on a current collector (e.g., a Cu foil, Ni foil, Al foil, etc.). For example, the silicon particles can be coated on a current collector with a binder. For instance, the particles can be added to a slurry and coated on a current collector. Additional conductive particles (e.g., super P, graphene, graphite, carbon nanofibers, carbon nanotubes, or other carbon) can also be added to the slurry. The slurry can contain a solvent and/or binder. In some instances, a binder is applied separately. In some implementations, the particles can be coated on a current collector without solvents. For example, the particles in a dry slurry can be coated on a current collector in a dry process In some implementations, the particles can be applied on a current collector coated with binder. In some instances, a binder can be applied separately.

The electrochemically active material can include from greater than 0% to about 100% by weight of silicon. For example, the electrochemically active material can include from greater than 0% to about 100% by weight of silicon. For example, the amount of silicon by weight of the electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, greater than about 0% to about 99% by weight, from about 10% to about 35% by weight, from about 10% to about 50% by weight, from about 10% to about 90% by weight, from about 10% to about 95% by weight, from about 10% to about 99% by weight, from about 10% to about 100% by weight, from about 30% to about 85% by weight, from about 30% to about 90% by weight, from about 30% to about 95% by weight, from about 30% to about 99% by weight, from about 30% to about 100% by weight, from about 50% to about 85% by weight, from about 50% to about 90% by weight, from about 50% to about 95% by weight, from about 50% to about 99% by weight, from about 50% to about 100% by weight, from about 60% to about 85% by weight, from about 60% to about 90% by weight, from about 60% to about 95% by weight, from about 60% to about 99% by weight, from about 60% to about 100% by weight, from about 70% to about 85% by weight, from about 70% to about 90% by weight, from about 70% to about 95% by weight, from about 70% to about 99% by weight, from about 70% to about 100% by weight, from about 80% to about 90% by weight, from about 80% to about 95% by weight, from about 80% to about 99% by weight, from about 80% to about 100% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 50% to about 100% by weight of silicon, at least about 60% to about 95% by weight of silicon, at least about 60% to about 99% by weight of silicon, at least about 60% to about 100% by weight of silicon, at least about 70% to about 95% by weight of silicon, at least about 70% to about 99% by weight of silicon, at least about 70% to about 100% by weight of silicon, at least about 80% to about 95% by weight of silicon, at least about 80% to about 99% by weight of silicon, at least about 80% to about 100% by weight of silicon. In some examples, the electrochemically active material can include 100% silicon.

Electrochemical Cells

In some implementations, the electrodes described herein can be used in any electrochemical device known in the art or yet to be developed. For example, the electrochemical device can be a battery, e.g., a lithium ion battery. In some implementations, the battery is a secondary battery, or in other implementations, the battery is a primary battery. The electrochemical device can include a first electrode, a second electrode, and an electrolyte. The first electrode can be any electrode described herein.

In some implementations, the electrode can include silicon particles coated on a current collector (e.g., with a binder). The electrochemically active material can include at least about 20% to about 100% by weight of silicon, at least about 30% to about 100% by weight of silicon, at least about 40% to about 100% by weight of silicon, at least about 50% to about 100% by weight of silicon, at least about 60% to about 100% by weight of silicon, at least about 70% to about 100% by weight of silicon, at least about 80% to about 100% by weight of silicon, etc. In some implementations, the electrode can be a film-based electrode described herein. The electrochemically active material can include from greater than 0% to about 99% by weight of silicon. In some such instances, the electrode can include a silicon-dominant electrode. As examples, the electrochemically active material can include at least about 20% to about 99% by weight of silicon, at least about 30% to about 99% by weight of silicon, at least about 40% to about 99% by weight of silicon, at least about 50% to about 99% by weight of silicon, at least about 60% to about 99% by weight of silicon, at least about 70% to about 99% by weight of silicon, at least about 80% to about 99% by weight of silicon, etc. The current collector can be any known in the art or yet to be developed. In some instances, the current collector can comprise copper, nickel, stainless steel, aluminum, etc.

The first electrode can comprise an anode. The second electrode can comprise a cathode. For example, the cathode can comprise Lithium-Cobalt-Oxide ($LiCoO_2$) (LCO). As another example, the cathode can comprise Lithium-Manganese-Oxide ($LiMnO_2$) (LMO). As other examples, the cathode can comprise Lithium Nickel-Cobalt-Manganese oxide (NCM) or Lithium Nickel-Cobalt-Aluminum oxide (NCA). In some implementations, the cathode can include a lithium rich oxide, a nickel-rich oxide, a high-voltage cathode material, a lithium rich layered oxide, a nickel-rich layered oxide, a high-voltage spinel oxide, and/or a high-voltage polyanionic compound. Lithium rich oxides may include $xLi_2Mn_3 \cdot (1-x)LiNi_aCo_bMn_cO_2$, where $0<x<1$, $a+b+c=1$. Nickel rich oxides may include $LiNi_xCo_yMn_zO_2$, where $0<x, y, z<1$ and $x+y+1=1$, (NCM) or $Li[Ni_xCo_yAl_{1-x-y}]O_2$, where $0 \leq x, y, z<1$ and $x+y+1=1$, (NCA). Nickel-rich layered oxides may include $LiNi_{1-x}M_xO_2$, where M comprises Co, Mn, or Al). Lithium rich layered oxides may include $LiNi_{1+x}M_{1-x}O_2$, where M comprises Co, Mn, or Ni). High-voltage spinel oxides may include $LiNi_{0.5}Mn_{1.5}O_4$. High-voltage polyanionic compounds may include phosphates, sulfates, silicates, etc. In some instances, high-voltage may refer to at least 4.7 V, 5 V, etc. In some instances, the cathode can comprise carbon black (e.g., Super P). In some implementations, the cathode can comprise a binder (e.g., PVdF, CMC, SBR, Sodium Alginate, PAI, PAA, Li-PAA, PI, and mixtures and combinations thereof). In some implementations, the cathode can comprise a current collector (e.g., Al foil). As an example, the cathode active material can be mixed with carbon black and binder to prepare a slurry. The slurry can be coated on the surface of the current collector. The solvent can be dried from the coated current collector to form a cathode. In some implementations, the cathode can be a film-based electrode. Other examples are possible.

In some implementations, the electrochemical device can comprise any electrolyte known in the art or yet to be developed. The electrolytes may be composed of cyclic carbonates, linear carbonates, and/or Li salts with or without additives. The cyclic carbonates can be fluoroethylene carbonate (FEC), di-fluoroethylene carbonate (DiFEC), Trifluoropropylene carbonate (TFPC), ethylene carbonate (EC), ethyl methyl carbonate (EMC), methyl acetate, and/or propylene carbonate (PC). The linear carbonates can be dimethyl carbonate (DMC), diethyl carbonate (DEC), gamma butyrolactone, Dimethoxyethane (DME), Dioxolane (DOL), 1,1,2,2-Tetrafluoroethyl 2,2,3,3-Tetrafluoropropyl Ether, other carbonate solvents (linear, cyclic or acyclic ones), ether solvents, etc. The Li salt can be hexafluorophosphate ($LiPF_6$), lithium tetrafluoroborate ($LiBF_4$), lithium hexafluoroarsenate monohydrate ($LiAsF_6$), lithium bis(trifluoromethanesulfonyl)imide (LiTFSI), lithium bis(fluorosulfonyl)imide (LiFSI), lithium difluoro(oxalate)borate (LiDFOB), lithium bis(oxalato)borate (LiBOB), lithium triflate ($LiCF_3SO_3$), lithium tetrafluorooxalato phosphate (LTFOP), lithium pentafluoroethyltrifluoroborate (LiFAB), lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), lithium tetrafluorooxalatophosphate (LiFOP), lithium perchlorate ($LiClO_4$), lithium difluorophosphate ($LiPO_2F_2$), or a combination thereof.

EXAMPLES

The following examples are provided to demonstrate the benefits of some implementations of electrodes, electrochemical cells, and methods of forming the same. These examples are discussed for illustrative purposes and should not be construed to limit the scope of the disclosed implementations.

Cells containing silicon-carbon composite electrodes completed formation using a 4 C charge current, and the performance of such cells improved by reducing and/or limiting the capacity charged during formation.

The cells were constructed using silicon-composite films with 80% silicon content by weight, with average loading of 3.8 mg/cm$^2$ and average thickness of 30 μm, attached to 15 μm copper foil with polyamide-imide adhesive. The cathodes were 92% NCM622, 4% conductive additive, and 4% PVdF, coated on 15 μm aluminum foil at an average loading of 23 mg/cm$^2$. The electrolyte was a solution of 1.2M $LiPF_6$ in organic carbonates. The prismatic, stacked cell design comprised of 5 layers, with a nominal capacity of 0.72 Ah. Five cells were constructed and tested for each condition.

During formation, the cells were clamped using fixtures made from steel plates, bolts, washers, and springs. A pressure of 140 psi was applied orthogonally to the plane of the cell surface (parallel to the smallest dimension of the cell). The cells were formed using 3 different formation protocols, shown in Table 1. No rest was used between the charge and discharge steps.

TABLE 1

Formation Protocols

| Formation Name | Description |
| --- | --- |
| Formation A (FormA) | Charge at 1 C to 4.2 V, Constant Voltage hold until current hits 0.05 C. Discharge at 1 C to 3.3 V. |
| Formation B (FormB) | Charge at 4 C for 5 minutes or until 4.2 V (stop at 4.2 V if the cell reaches 4.2 V in less than 5 minutes). Discharge at 1 C to 3.3 V. |
| Formation C (FormC) | Charge at 4 C to 4.2 V, Constant Voltage hold until current hits 0.05 C. Discharge at 1 C to 3.3 V. |

Figure 4:
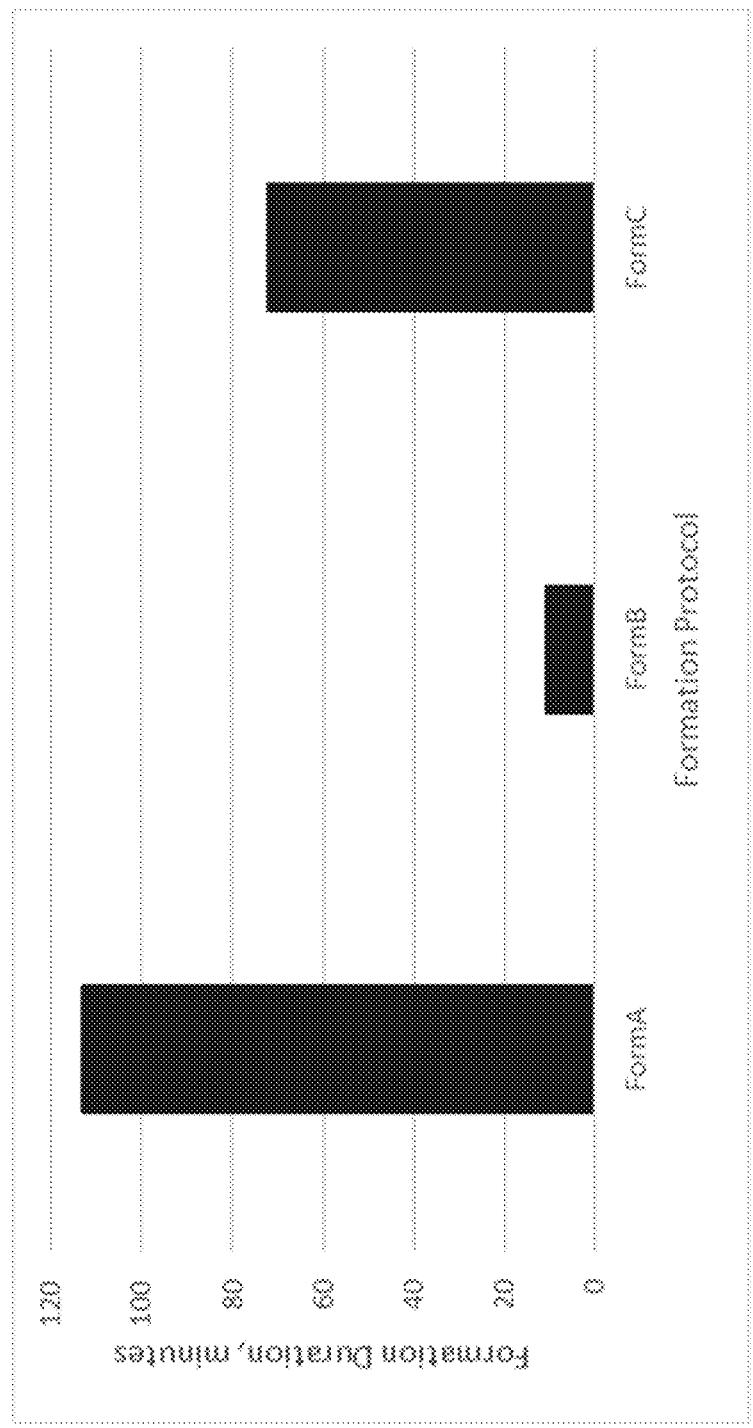
FIG. 4 shows the measured formation duration of cells formed by three different formation protocols.

The Formation A protocol charged the cells at 1 C to 100% SOC. The Formation B protocol charged the cells at 4 C to approximately 33% SOC, while the Formation C protocol charged the cells at 4 C using Constant Current/Constant Voltage (CC/CV) formation to 100% SOC. As shown in FIG. 4, the 4 C partial-charge formation (Formation B) and the 4 C full-charge formation (Formation C) took less time than for the 1 C full-charge formation (Formation A), with the 4 C partial-charge formation taking approximately 10% of the time used for the 1 C full-charge formation.

Cycling is a method of simulating the use of a cell in a typical application. It is not part of the formation process. Cycling was used to evaluate the effect of varying formation on the expected performance of the cell. During the cycling tests, the cells were clamped with an initial pressure of ~30 psi using fixtures made from aluminum plates, EPDM foam, bolts, and washers. The cells were cycled using the protocol described in Table 2.

TABLE 2

Cycling Protocol

| Cycle No. | Details |
| --- | --- |
| 1, 101, 201, etc. | Charge at 0.33 C to 4.2 V, Constant Voltage hold until current hits 0.05 C, rest 5 minutes, discharge at 0.33 C to 3 V, rest 5 minutes |
| 2-100, 102-200, etc. | Charge at 4 C to 4.2 V, Constant Voltage hold until current hits 0.05 C, rest 5 minutes, discharge at 0.5 C to 3 V, rest 5 minutes |

Figure 5:
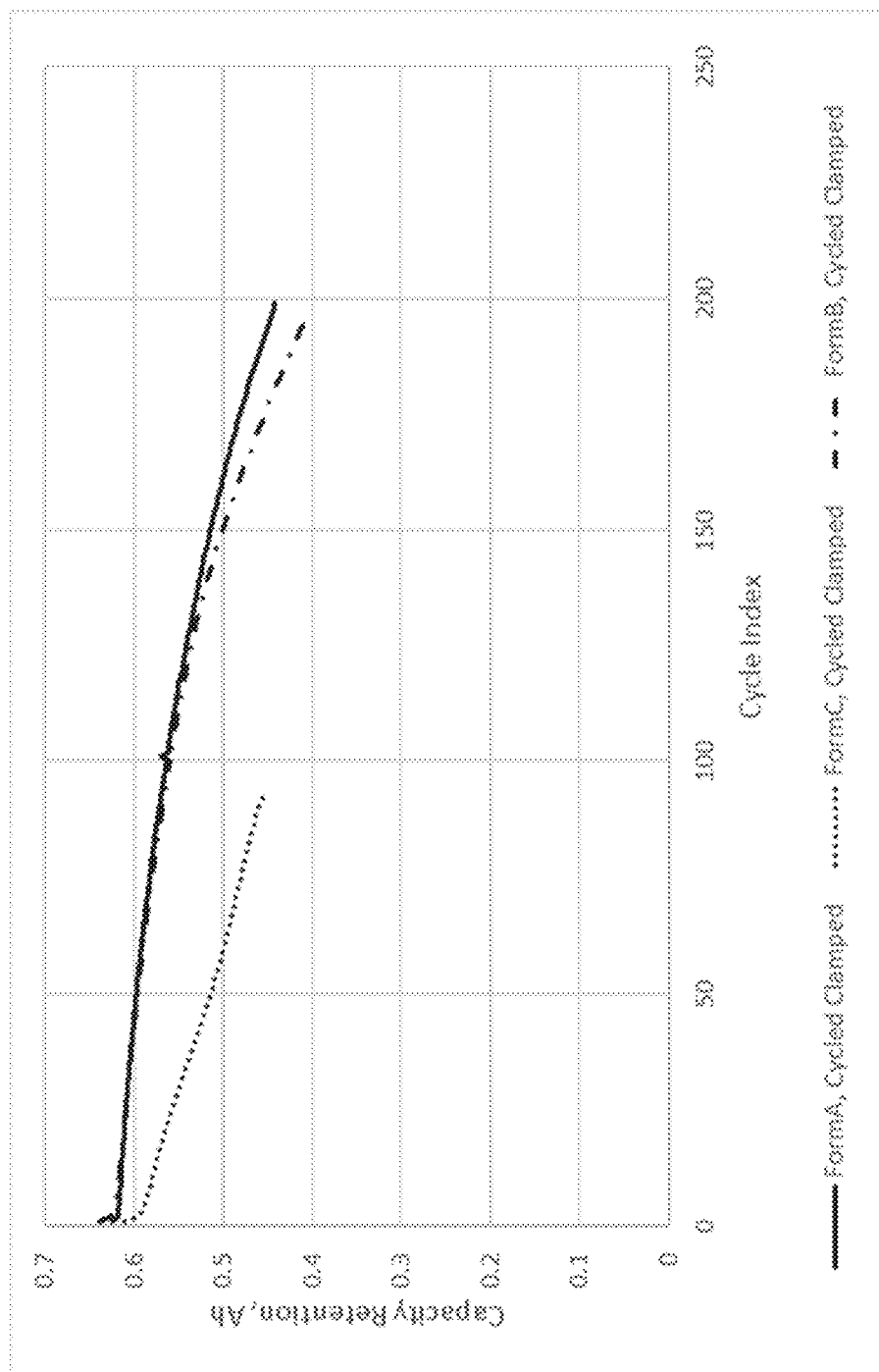
FIG. 5 shows the Average Discharge Capacity Retention vs. Cycle Index for cells formed by three different formation protocols.

FIG. 5 shows the Average Discharge Capacity Retention vs Cycle Index for the 5 cells prepared with each formation condition. Performance of cells with 4 C formation were improved by charging to a lower SOC during formation. For example, forming the cells with 4 C charge rate to 100% SOC (Formation C) caused the cells to have lower initial capacity and faster capacity fade. For cells with an initial formation charge rate of 4 C, the initial capacity and capacity fade were both improved by charging the cells for 5 minutes to approximately 33% SOC (Formation B) instead of using the CC/CV formation to 100% SOC (Formation C).

Figure 6:
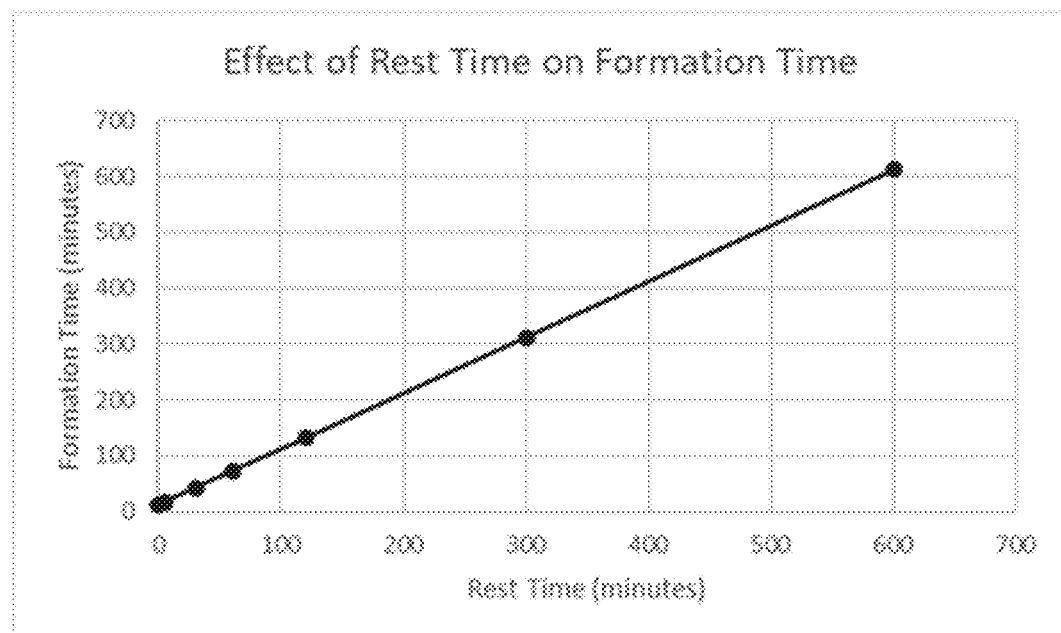
FIGS. 6 and 7 show the effects of rest time on the formation time and production rate respectively for certain implementations described herein.
Figure 7:
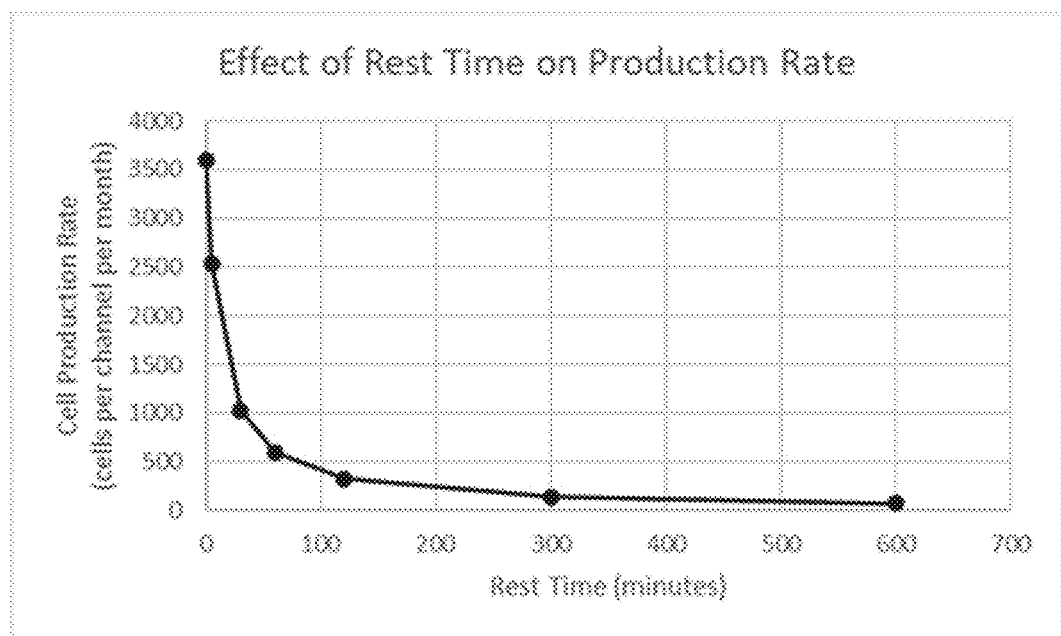

In some implementations, the Formation B protocol may be advantageous over both Formation A and Formation C protocols since it has a good mix of performance vs time spent in formation. Since cost can be a driver in the battery industry, this can allow for lower cost formation of cells while maintaining performance. In some instances, a very fast rate can be used (which could hurt other chemistries) while not charging to 100% SOC. FIG. 6 shows the effect of adding a rest of various lengths on the formation time for the Formation B protocol. FIG. 7 shows the effect of rest time on the production rate, which was calculated from the formation time. By reducing the rest time and/or charging to a partial SOC, various implementations described herein can advantageously reduce the formation time and increase the production rate.

Various implementations have been described herein. Although the invention has been described with reference to these specific implementations, the descriptions are intended to be illustrative and are not intended to be limiting. Various modifications and applications may occur to those skilled in the art without departing from the true spirit and scope of the invention as defined in the appended claims.

What is claimed is:

1. A method of forming an electrochemical cell, the method comprising:
providing an electrochemical cell comprising:
a first electrode and a second electrode, wherein at least the first electrode comprises electrochemically active material having at least about 20% to about 100% by weight of silicon;
a separator between the first electrode and the second electrode; and
an electrolyte in contact with the first electrode, the second electrode, and the separator,
wherein the electrochemical cell has a rated capacity of 1 C;
charging the electrochemical cell by providing a formation charge current at about 1 C or greater to the electrochemical cell; and
discharging the electrochemical cell after a rest between the charging and the discharging;
wherein parameters of the charging are set or adjusted such that a duration of the rest is substantially no more than 5 minutes, and
wherein one or more of the charging of the electrochemical cell, the rest, and the discharging of the electrochemical cell are configured such that the forming of the electrochemical cell is completed in about 10 minutes to about 120 minutes.

2. The method of claim 1, wherein the formation charge current is provided at less than or equal to about 20 C.

3. The method of claim 1, wherein the formation charge current is provided at greater than about 2 C.

4. The method of claim 3, wherein the formation charge current is provided at 4 C or greater.

5. The method of claim 4, wherein the formation charge current is provided at less than or equal to about 20 C.

6. The method of claim 1, wherein the formation charge current is provided for about 3 minutes to about 60 minutes.

7. The method of claim 1, wherein providing the formation charge current comprises charging to partial State of Charge (SOC).

8. The method of claim 7, wherein charging to partial SOC comprises charging to about 10% to about 90% of total capacity of the electrochemical cell.

9. The method of claim 8, wherein charging to partial SOC comprises charging to about 20% to about 70% of the total capacity of the electrochemical cell.

10. The method of claim 9, wherein charging to partial SOC comprises charging to about 30% to about 50% of the total capacity of the electrochemical cell.

11. The method of claim 1, wherein the formation charge current is provided at about 1 C to about 10 C up to a State of Charge (SOC) of about 10% to about 50%.

12. The method of claim 11, wherein the formation charge current is provided at about 2 C to about 6 C up to an SOC of about 20% to about 40%.

13. The method of claim 1, wherein providing the formation charge current comprises providing a substantially constant formation charge current.

14. The method of claim 1, wherein providing the formation charge current comprises providing the formation charge current at a charge voltage from about 3 volts to about 6 volts.

15. The method of claim 1, wherein the electrochemical cell is a lithium-ion battery and providing the formation charge current comprises providing the formation charge current with substantially no lithium plating.

16. The method of claim 1, wherein the first electrode is an anode.

17. The method of claim 1, wherein the first electrode comprises a silicon-dominant electrode.

18. The method of claim 1, wherein the first electrode comprises the electrochemically active material having the silicon at about 30% to about 100% by weight.

19. The method of claim 18, wherein the first electrode comprises the silicon at about 40% to about 100% by weight.

20. The method of claim 19, wherein the first electrode comprises the silicon at about 50% to about 100% by weight.

21. The method of claim 20, wherein the first electrode comprises the silicon at about 60% to about 100% by weight.

22. The method of claim 21, wherein the first electrode comprises the silicon at about 70% to about 100% by weight.

23. The method of claim 22, wherein the first electrode comprises the silicon at about 80% to about 100% by weight.

24. The method of claim 1, wherein the first electrode comprises a silicon-carbon composite material film.

25. The method of claim 24, wherein the composite material film is a self-supported composite structure.

26. The method of claim 24, wherein the film is attached to a current collector.

27. The method of claim 1, wherein the second electrode comprises Lithium Nickel-Cobalt-Manganese oxide (NCM).

28. The method of claim 1, wherein the first electrode further comprises graphite.

* * * * *